(12) United States Patent
Choi et al.

(10) Patent No.: US 10,364,331 B2
(45) Date of Patent: Jul. 30, 2019

(54) COMPOSITE ELECTROLYTE MEMBRANE AND METHOD FOR MANUFACTURING SAME

(71) Applicants: LG CHEM, LTD., Seoul (KR); SEOUL NATIONAL UNIVERSITY R&DB FOUNDATION, Seoul (KR)

(72) Inventors: Seong Ho Choi, Daejeon (KR); Jong-Chan Lee, Seoul (KR); Hyuk Kim, Daejeon (KR); Doyoung Kim, Daejeon (KR); Ji Hun Kim, Daejeon (KR); Taeyun Ko, Seoul (KR); Bo-Kyung Jung, Suwon (KR); Kihyun Kim, Seoul (KR)

(73) Assignees: LG CHEM, LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 421 days.

(21) Appl. No.: 15/318,166

(22) PCT Filed: Jun. 12, 2015

(86) PCT No.: PCT/KR2015/005967
§ 371 (c)(1),
(2) Date: Dec. 12, 2016

(87) PCT Pub. No.: WO2015/190887
PCT Pub. Date: Dec. 17, 2015

(65) Prior Publication Data
US 2017/0114197 A1    Apr. 27, 2017

(30) Foreign Application Priority Data
Jun. 13, 2014   (KR) .................. 10-2014-0072441

(51) Int. Cl.
*H01M 8/1051* (2016.01)
*C08J 5/22* (2006.01)
(Continued)

(52) U.S. Cl.
CPC ............ *C08J 5/2275* (2013.01); *C08G 75/23* (2013.01); *C08J 5/22* (2013.01); *C08K 9/10* (2013.01);
(Continued)

(58) Field of Classification Search
None
See application file for complete search history.

(56) References Cited

U.S. PATENT DOCUMENTS

2007/0292730 A1    12/2007  McGrath et al.
2012/0225361 A1*   9/2012   Wang ................. H01M 8/1023
                                                              429/409

FOREIGN PATENT DOCUMENTS

KR    10-2003-0076057 A    9/2003
KR    10-2006-0115886 A    11/2006
(Continued)

OTHER PUBLICATIONS

International Search Report, issued in PCT/KR2015/005967, dated Sep. 18, 2015.

*Primary Examiner* — Wyatt P McConnell
(74) *Attorney, Agent, or Firm* — Birch, Stewart, Kolasch & Birch, LLP

(57) ABSTRACT

The present application relates to a composite electrolyte membrane and a method for manufacturing the same. The composite electrolyte membrane according to the present application includes: a poly(arylene ether sulfone) copolymer including the repeating unit represented by Chemical Formula 1 and the repeating unit represented by Chemical
(Continued)

Formula 2; and a core-shell particle including an inorganic particle core and a basic organic polymer shell.

10 Claims, 1 Drawing Sheet

(51) Int. Cl.
| | | |
|---|---|---|
| *C08G 75/23* | (2006.01) | |
| *C08K 9/10* | (2006.01) | |
| *C08L 81/06* | (2006.01) | |
| *H01M 8/1032* | (2016.01) | |
| *H01M 8/1048* | (2016.01) | |
| *H01M 8/1018* | (2016.01) | |

(52) U.S. Cl.
CPC ........... *C08L 81/06* (2013.01); *H01M 8/1032* (2013.01); *H01M 8/1048* (2013.01); *H01M 8/1051* (2013.01); *C08J 2381/06* (2013.01); *H01M 2008/1095* (2013.01); *Y02P 70/56* (2015.11)

(56) References Cited

FOREIGN PATENT DOCUMENTS

| KR | 10-2010-0058952 A | 6/2010 |
|---|---|---|
| KR | 10-2013-0000662 A | 1/2013 |
| KR | 10-2013-0050825 A | 5/2013 |
| KR | 10-2013-0070128 A | 6/2013 |

* cited by examiner

[Figure 1]
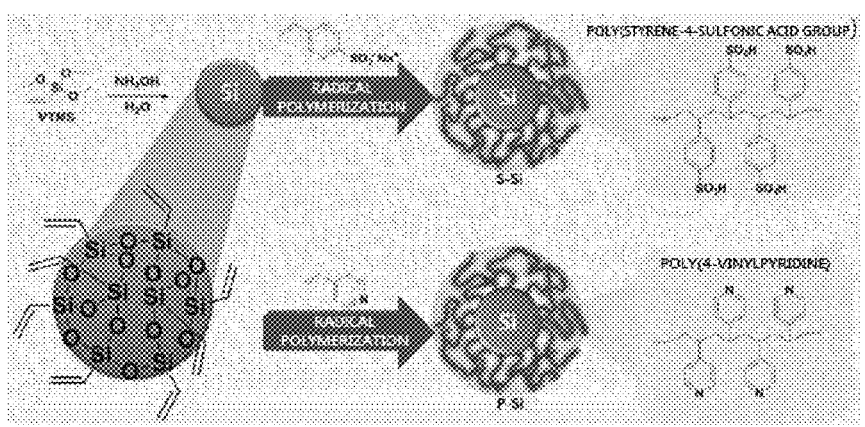
[Figure 2]
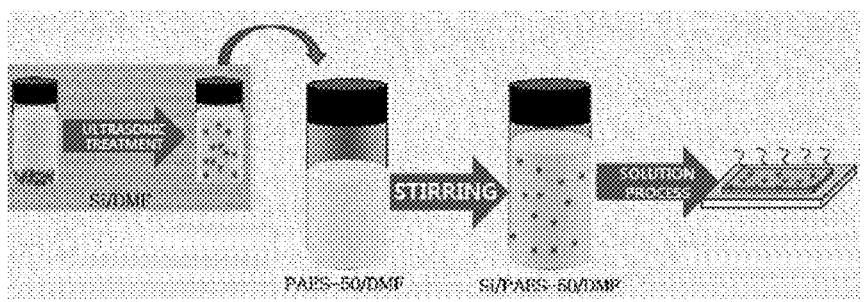

COMPOSITE ELECTROLYTE MEMBRANE AND METHOD FOR MANUFACTURING SAME

TECHNICAL FIELD

This application claims priority to and the benefit of Korean Patent Application No. 10-2014-0072441 filed in the Korean Intellectual Property Office on Jun. 13, 2014, the entire contents of which are incorporated herein by reference. The present application relates to a composite electrolyte membrane and a method for manufacturing the same.

BACKGROUND ART

Recently, with the expected exhaustion of the existing energy resources such as petroleum or coal, there is a growing interest in energy which may substitute for the existing energy resources. As one of these alternative energies, a fuel cell is receiving particular attention due to the advantages in that the fuel cell is highly efficient and does not discharge pollutants such as NOx and Sox, and the fuel used is abundant.

A fuel cell is a power generation system which converts chemical reaction energy of a fuel and an oxidizing agent into electric energy, and representatively, hydrogen and hydrocarbons such as methanol or butane are used as the fuel, and oxygen is used as the oxidizing agent.

Examples of the fuel cell include a polymer electrolyte membrane fuel cell (PEMFC), a direct methanol fuel cell (DMFC), a phosphoric acid fuel cell (PAFC), an alkaline fuel cell (AFC), a molten carbonate fuel cell (MCFC), a solid oxide fuel cell (SOFC), and the like. Among them, the polymer electrolyte membrane fuel cell has been the most actively studied due to a high energy density and a high output. The polymer electrolyte membrane fuel cell is different from the other fuel cells, in that a solid polymer electrolyte membrane is used instead of a liquid polymer electrolyte membrane.

DETAILED DESCRIPTION OF THE INVENTION

Technical Problem

The present application has been made in an effort to provide a composite membrane for a fuel cell, which has excellent hydrogen ion conductivity, mechanical properties, dimensional stability, and the like, and a method for manufacturing the same.

Technical Solution

An exemplary embodiment of the present application provides a composite electrolyte membrane including:

a poly(arylene ether sulfone) copolymer including a repeating unit represented by the following Chemical Formula 1 and a repeating unit represented by the following Chemical Formula 2; and a core-shell particle including an inorganic particle core and a basic organic polymer shell.

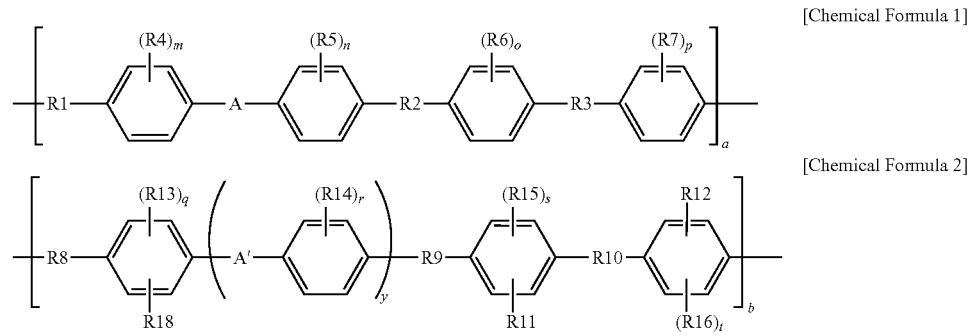

[Chemical Formula 1]

[Chemical Formula 2]

In Chemical Formulae 1 and 2,

R1 to R3 and R8 to R10 are each independently —O—, —S—, —SO$_2$—, —C=O— or —C(CH$_3$)$_2$—, R4 to R7 and R13 to R16 are each independently hydrogen, or a straight-chained or branch-chained alkyl group having 1 to 10 carbon atoms, at least one of R11, R12, and R18 is —SO$_3$R17, and the others are hydrogen, or a straight-chained or branch-chained alkyl group having 1 to 10 carbon atoms, R17 is H, Li, Na, or K, A and A' are each independently a direct bond, a divalent fluorene group, or a straight-chained or branch-chained alkylene group having 1 to 10 carbon atoms, m, n, o, p, and r are each independently 0 to 4, and q, s, and t are each independently 0 to 3, y is 0 or 1, and a and b are a molar ratio of Chemical Formulae 1 and 2, and are each independently 0.1 to 0.99.

Further, another exemplary embodiment of the present application provides a method of manufacturing a composite electrolyte membrane, the method including:

preparing a poly(arylene ether sulfone) copolymer including the repeating unit represented by Chemical Formula 1 and the repeating unit represented by Chemical Formula 2;

preparing a composition including: the poly(arylene ether sulfone) copolymer; and a core-shell particle including an inorganic particle core and a basic organic polymer shell, and forming a composite electrolyte membrane by using the composition.

In addition, still another exemplary embodiment of the present application provides a fuel cell including the composite electrolyte membrane.

Advantageous Effects

The composite electrolyte membrane according to the present application may improve hydrogen ion conductivity, dimensional stability, mechanical strength, and the like by including a core-shell particle having a basic organic polymer shell and a poly(arylene ether sulfone) copolymer, as compared to a polymer electrolyte membrane including only a poly(arylene ether sulfone) copolymer.

Further, the composite electrolyte membrane according to the present application may improve hydrogen ion conductivity, dimensional stability, and the like, as compared to a composite electrolyte membrane including a particle which does not include a shell structure, and a poly(arylene ether sulfone) copolymer.

In addition, the composite electrolyte membrane according to the present application may improve hydrogen ion conductivity, dimensional stability, and the like, as compared to a composite electrolyte membrane including a core-shell particle having an acid polymer shell and a poly(arylene ether sulfone) copolymer.

In particular, the composite electrolyte membrane according to the present application has flexibility which may adjust hydrogen ion conductivity, mechanical properties, dimensional stability, and the like according to the size of the inorganic core, the size of the organic polymer shell, the content ratio of the poly(arylene ether sulfone) copolymer and the core-shell particle, and the like.

DESCRIPTION OF DRAWINGS

FIG. 1 is a view schematically illustrating a process of forming a core-shell particle of a composite electrolyte membrane according to an exemplary embodiment of the present application.

FIG. 2 is a view schematically illustrating a process of manufacturing the composite electrolyte membrane according to an exemplary embodiment of the present application.

BEST MODE

Hereinafter, the present application will be described in more detail.

A hydrocarbon-based polymer electrolyte membrane has excellent heat and oxidation stability, mechanical properties, processability, and the like, but has a disadvantage in that the hydrogen ion conductivity usually deteriorates as compared to Nafion. When the degree of sulfonation is extremely increased by increasing the content of a sulfonic acid group in order to increase the hydrogen ion conductivity, the hydrocarbon-based polymer electrolyte membrane gets to have a large expansion coefficient while the water content is increasing, and as a result, the dimensional stability deteriorates. As one of the methods for overcoming a deterioration in dimensional stability, a manufacture of a composite electrolyte membrane in which an inorganic material is added to a polymer matrix has been studied. Among them, the use of silica particles having excellent hygroscopic property could improve not only dimensional stability, but also hydrogen ion conductivity.

Silica particles in the related art have a problem in that the particles aggregate too much in a polymer matrix, and accordingly, the aggregation acts as a defect even in an electrolyte membrane. Thus, the present application has been made in an effort to improve the dispersibility by using a core-shell particle formed by introducing a basic organic polymer which may exert an acid-base interaction with a polymer matrix.

Further, a composite electrolyte membrane including a core-shell silica particle using a polymer shell including a sulfonic acid group in the related art may have high hydrogen ion conductivity based on high ion exchange capacity (IEC), but has a problem in that stability is decreased due to a high expansion coefficient. Thus, the present application has been made in an effort to improve both dimensional stability and hydrogen ion conductivity through acid-base interaction by using a basic organic polymer shell.

A composite electrolyte membrane according to an exemplary embodiment of the present application includes: a poly(arylene ether sulfone) copolymer including the repeating unit represented by Chemical Formula 1 and the repeating unit represented by Chemical Formula 2; and a core-shell particle including an inorganic particle core and a basic organic polymer shell.

In the present application, the repeating unit represented by Chemical Formula 1 is a monomer which does not include a sulfonic acid group, the repeating unit represented by Chemical Formula 2 is a monomer including a sulfonic acid group, and a degree of sulfonation in the polymer may be adjusted by adjusting a molar ratio of the repeating units.

In the present application, when the molar ratio of the repeating unit represented by Chemical Formula 2 is too low, the hydrogen ion conductivity may not be sufficiently secured, so that it is preferred that the molar ratio of the repeating unit represented by Chemical Formula 2 is maximally increased. When the copolymer is synthesized by using the repeating unit which does not include a sulfonic acid group and the repeating unit which includes a sulfonic acid group at a molar ratio of 1:1, it is possible to achieve a hydrogen ion conductivity which is similar to or a little lower than that of Nafion, and when the molar ratio of the repeating unit including the sulfonic acid group is higher than the aforementioned molar ratio, it is difficult to increase the degree of polymerization of the copolymer, and the dimensional stability of an electrolyte membrane manufactured by using the copolymer may drastically deteriorate. In the present application, the molar ratio of the repeating unit represented by Chemical Formula 1: the repeating unit represented by Chemical Formula 2 may be 1:0.1 to 2:3, but is not limited thereto.

In the present application, Chemical Formula 2 may be represented by the following Chemical Formula 2-1.

[Chemical Formula 2-1]

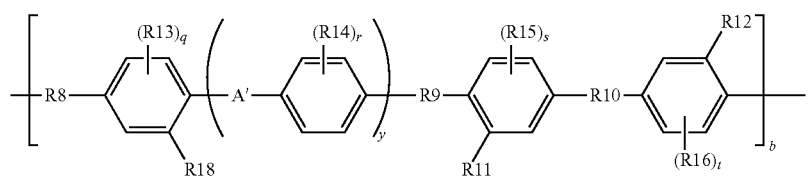

In Chemical Formula 2-1, definitions of R8 to R16, R18, A', q, r, s, t, y, and b are the same as those of Chemical Formula 2.

In the present application, a copolymer including the repeating units represented by Chemical Formula 1 and Chemical Formula 2 as a main chain may be prepared by using a dihydroxy monomer, a difluoro monomer, a monomer of the following structural formulae, and the like.

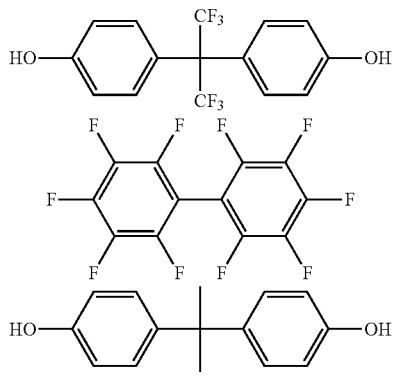

In the present application, a viscosity of the cross-linked poly(arylene ether sulfone) copolymer may be 1.23 dL g$^{-1}$, but is not limited thereto.

In addition, in the present application, a degree of sulfonation of the cross-linked poly(arylene ether sulfone) may be more than 0 and 0.6 or less, but is not limited thereto.

In the present application, the copolymer has a weight average molecular weight of 10,000 to 3,000,000, and specifically, preferably 50,000 to 1,000,000, and more preferably 50,000 to 800,000. When the weight average molecular weight is within the range, the copolymer may have high solubility and excellent mechanical properties.

In general, an aromatic hydrocarbon-based polymer electrolyte membrane has excellent dimensional stability and mechanical properties, but may have a disadvantage in that the hydrogen ion conductivity is high. When the degree of sulfonation is increased in order to overcome the disadvantage, there occurs a problem in that the dimensional stability and mechanical properties of the electrolyte membrane deteriorate. Since the cross-linked poly(arylene ether sulfone) copolymer according to an exemplary embodiment of the present application includes a cross-linked structure containing a sulfonic acid group, the total degree of sulfonation of the electrolyte membrane may be increased, and accordingly, it is possible to bring about both an effect, which is advantageous for the hydrogen ion conductivity, and an effect of preventing the dimensional stability and mechanical properties of the electrolyte membrane from deteriorating through the cross-linkage. That is, the cross-linked electrolyte membrane according to an exemplary embodiment of the present application may exhibit improved performances in terms of not only hydrogen ion conductivity, but also dimensional stability and mechanical properties.

In the present application, the core-shell particle includes an inorganic particle core and a basic organic polymer shell.

The inorganic particle core may include a silica particle, $TiO_2$, $ZrO_2$, and like, but is not limited thereto.

The inorganic particle core may use an inorganic particle or a surface-treated inorganic particle. The surface treatment uses a silane-based compound such as vinyltrimethoxysilane, and may be performed by a condensation reaction between the inorganic particle and the silane-based compound, and it is preferred to include a vinyl group on the surface of the inorganic particle by the surface treatment, but the surface treatment is not limited thereto.

A diameter of the core of the inorganic particle may be 20 nm to 900 nm, specifically 700 to 800 nm, but is not limited thereto. The diameter of the inorganic particle core may be adjusted by varying the pH of a solution when the inorganic particle is synthesized. When the diameter of the inorganic particle core is within the range, it is possible to prevent inorganic particles from being aggregated by increasing the degree of dispersion, and to achieve excellent surface characteristics of the electrolyte membrane.

According to an exemplary embodiment of the present application, "the base" in the basic organic polymer shell may be interpreted to be an electron donor which has an unshared electron pair according to the Lewis definition, and may give the electrons. The basic organic polymer shell includes a sulfonic acid group, and thus may exert an acid-base interaction with a copolymer having an acid group.

The basic organic polymer shell may include a polymer prepared by using one or more selected from poly(4-vinylpyridine); and a monomer of the following structural formula, but is not limited thereto.

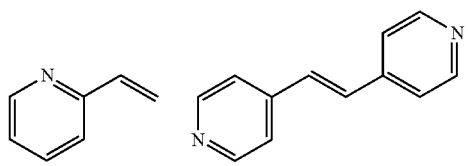

A thickness of the basic organic polymer shell may be 5 to 20 nm, but is not limited thereto.

The core-shell particle may be formed by radical polymerization between a vinyl group and an organic polymer on the surface of the inorganic particle.

In the present application, a content of the core-shell particle may be more than 0 and 10 wt % based on the total weight of the poly(arylene ether sulfone) copolymer, but is not limited thereto.

The composite electrolyte membrane according to the present application has characteristics in that it is possible to improve not only hydrogen ion conductivity, but also mechanical properties, dimensional stability, and the like.

When an inorganic particle such as a silica particle is introduced into a polymer electrolyte membrane, stability and mechanical properties may be improved by interaction between the polymer and the inorganic particle. In particular, in the present application, a basic polymer shell is introduced into an inorganic particle. Since a poly(arylene ether sulfone) copolymer has a sulfonic acid group, and thus displays acidity, the copolymer may exert an acid-base interaction with the basic polymer shell introduced as described above, and thus aid core-shell silica particles in being mixed better. In addition, the stability and mechanical properties may be further improved by the acid-acid interaction. In order to improve the hydrogen ion conductivity of the electrolyte membrane, the amount of sulfonic acid group need to be large. Since the sulfonic acid of the basic shell captures hydrogen ions, the amount of effective sulfonic acid group may be smaller than when an acid shell is introduced. However, when a composite electrolyte membrane is manufactured by introducing an inorganic particle having a basic shell thereinto, less expansion occurs in a state where the electrolyte membrane contains water due to the effects resulting from an acid-base interaction between the shell and the copolymer. As a result, the number of sulfonic acid groups per unit volume of the electrolyte membrane containing water in the case of an electrolyte membrane into which inorganic particles having a basic shell is introduced is larger than that in the case of an electrolyte membrane into which an acid shell is introduced. For this reason, it is possible to improve stability, physical properties, hydrogen ion conductivity.

Further, a method for manufacturing the composite electrolyte membrane according to an exemplary embodiment of the present application includes: preparing a poly(arylene ether sulfone) copolymer including the repeating unit represented by Chemical Formula 1 and the repeating unit represented by Chemical Formula 2; preparing a composition including: the poly(arylene ether sulfone) copolymer; and a core-shell particle including an inorganic particle core and a basic organic polymer shell; and forming a composite electrolyte membrane including the composition.

In the present application, the composition may additionally include an organic solvent, and as the organic solvent, an organic solvent known in the art may be used without limitation. That is, the composition may be prepared by dissolving the poly(arylene ether sulfone) copolymer and the core-shell particle in an organic solvent.

The method for forming the composite electrolyte membrane may use a solution process, but is not limited thereto.

In an exemplary embodiment of the present application, the solution process may be performed by a process of putting core-shell particles into N,N-dimethylformamide (DMF), and ultrasonically treating the resulting mixture to disperse the particles. After the solution is put into a solution in which the poly(arylene ether sulfone) copolymer is dissolved in DMF, and the resulting mixture is mixed, the resulting solution is cast onto a glass plate, and heat treatment is performed at 60° C. for 12 hours to evaporate the solvent, thereby manufacturing a composite electrolyte membrane.

The present application provides a membrane electrode assembly including the composite electrolyte membrane. More specifically, the membrane electrode assembly may further include a cathode provided on one surface of the composite electrolyte membrane and an anode provided on the other surface of the composite electrolyte membrane.

The cathode and the anode may each include a catalyst layer and a gas diffusion layer, and the polymer electrolyte membrane may be provided between a cathode catalyst layer and an anode catalyst layer. The polymer electrolyte membrane may be provided while being brought into contact with the cathode catalyst layer and the anode cathode layer.

In the present application, the composite electrolyte membrane may be provided between a cathode catalyst layer and an anode catalyst layer, and may serve as a medium through which hydrogen ions pass, and a separation membrane between the air and a hydrogen gas. The higher the hydrogen ion mobility of the composite electrolyte membrane is, the more enhanced the performance of the membrane electrode assembly is.

In the present application, the cathode and the anode may be an electrode for a fuel cell according to the present specification.

The oxidation reaction of a fuel occurs in the catalyst layer of the anode, and the reduction reaction of an oxidizing agent occurs in the catalyst layer of the cathode.

The catalyst layer may include a catalyst.

The catalyst is not limited in kind as long as the catalyst can serve as a catalyst in a fuel cell, but may include one of platinum, a transition metal, and a platinum-transition metal alloy.

Here, the transition metal is an element of Groups 3 to 11 in the periodic table, and may be any one of, for example, ruthenium, osmium, palladium, molybdenum, and rhodium.

Specifically, as the catalyst, it is possible to use a catalyst selected from the group consisting of platinum, ruthenium, osmium, a platinum-ruthenium alloy, a platinum-osmium alloy, a platinum-palladium alloy, a platinum-molybdenum alloy, and a platinum-rhodium alloy, but the catalyst is not limited thereto.

The catalysts in the catalyst layer may be not only used as they are as the catalyst layer, but also used while being supported on a carbon-based carrier.

As the carbon-based carrier, any one selected from the group consisting of graphite, carbon black, acetylene black, Denka black, Ketjen black, activated carbon, mesoporous carbon, carbon nanotube, carbon nano fiber, carbon nano horn, carbon nano ring, carbon nano wire, fullerene (C60), and Super P black, or a mixture of two or more thereof may be a preferred example.

The catalyst layer may further include an ionomer.

The ionomer serves to provide a channel through which ions produced by reaction between a fuel such as hydrogen or methanol and a catalyst move to a composite electrolyte membrane.

As the ionomer, specifically, a Nafion ionomer or a sulfonated polymer such as sulfonated trifluorostyrene may be used.

In an exemplary embodiment of the present specification, the electrode for a fuel cell may further include a gas diffusion layer provided on one surface of the catalyst layer. The gas diffusion layer serves as both a current conductor and a channel through which reaction gases and water move, and has a porous structure. Accordingly, the gas diffusion layer may include a conductive base material.

As the conductive base material, a typical material known in the art may be used, but for example, carbon paper, carbon cloth, or carbon felt may be preferably used, and the conductive base material is not limited thereto.

The present application provides a fuel cell including the composite electrolyte membrane.

An exemplary embodiment of the present application provides a fuel cell including: a stack including the two or more membrane electrode assemblies and a separator provided between the membrane electrode assemblies; a fuel supply part which supplies a fuel to the stack; and an oxidizing agent supply part which supplies an oxidizing agent to the stack.

The stack includes one or two or more of the above-described membrane electrode assembly, and when two or more membrane electrode assemblies are included, the stack includes a separator interposed therebetween. The separator serves to prevent membrane electrode assemblies from being electrically connected to each other, and to transfer fuel and an oxidizing agent supplied from the outside to the membrane electrode assemblies.

The oxidizing agent supply part serves to supply the oxidizing agent to the stack. As the oxidizing agent, oxygen is representatively used, and oxygen or the air may be used by being injected using a pump.

The fuel supply part serves to supply a fuel to a stack, and may be composed of a fuel tank which stores the fuel and a pump which supplies the fuel stored in the fuel tank to the stack. As the fuel, hydrogen or a hydrocarbon fuel in a gas or liquid state may be used. Examples of the hydrocarbon fuel include methanol, ethanol, propanol, butanol, or natural gases.

[Mode For Invention]

Hereinafter, the present specification will be described in more detail through Examples. However, the following Examples are provided only for exemplifying the present specification, but are not intended to limit the present specification.

EXAMPLES

Example 1

1) Preparation of Poly(Arylene Ether Sulfone) Copolymer

A poly(arylene ether sulfone) copolymer was synthesized by a nucleophilic substitution reaction among a 4,4'-dihydroxy biphenyl monomer, 3,3'-disulfonate-4,4'-difluorodiphenyl sulfone, and a 4,4-difluorodiphenyl sulfone monomer. In the present application, 3,3-disulfonate-4,4'-difluorodiphenyl sulfone and 4,4-difluorodiphenyl sulfone were used at a molar ratio of 1:1. The synthesized copolymer had a degree of sulfonation of 50%, and was named as "PAES-50".

2) Preparation of Core-Shell Particle

As illustrated in the following FIG. 1, vinyltrimethoxysilane (VTMS) was put into distilled water at normal temperature, and ammonia water was added to the resulting mixture while stirring the mixture. Silica particles obtained 12 hours later were washed with distilled water and ethanol. The silica particle thus obtained was denoted as "Si", and the particle has a vinyl group on the surface thereof, and thus may undergo a radical reaction.

Azobisisobutyronitrile (AIBN) as an initiator was put into a solution of the silica particle and 4-vinylpyridine dissolved in N,N-dimethylacetamide (DMAc), and the resulting mixture was subjected to radical polymerization at 60° C. for 2 days.

After the reaction, the silica particles were washed with distilled water and ethanol, and the silica particle thus prepared was a core-shell silica particle having a poly(4-vinylpyridine) shell which is a basic polymer, and was named as "P-Si".

Comparative Example 1

In Example 1, the same reaction was performed by using styrene-4-sodium sulfonate instead of 4-vinylpyridine during the preparation of the core-shell particle. In order to change sodium ions of poly(styrene-4-sulfonic acid group) into hydrogen ions, the silica particle was treated with 1 M sulfonic acid at normal temperature for 24 hours, and then washed with distilled water. The silica particle thus prepared was a core-shell silica particle having a poly(styrene-4-sulfonic acid group) shell which is an acid polymer, and was named as "S-Si".

<Experimental Example> Manufacture of Composite Electrolyte Membrane

As illustrated in the following FIG. 2, silica particles were put into N,N-dimethylformamide (DMF), and ultrasonic treatment was performed to disperse the silica particles. A solution of silica dispersed in DMF was put into a solution of PAES-50 dissolved in an amount of 15 wt % in DMF, and then the resulting mixture was stirred for 24 hours.

The mixed solution was cast to have a thickness of 250 μm onto a glass plate by a doctor blade, and then the glass plate was subjected to heat treatment at 60° C. in an oven for 12 hours. The electrolyte membrane made as described above was impregnated in distilled water and detached from

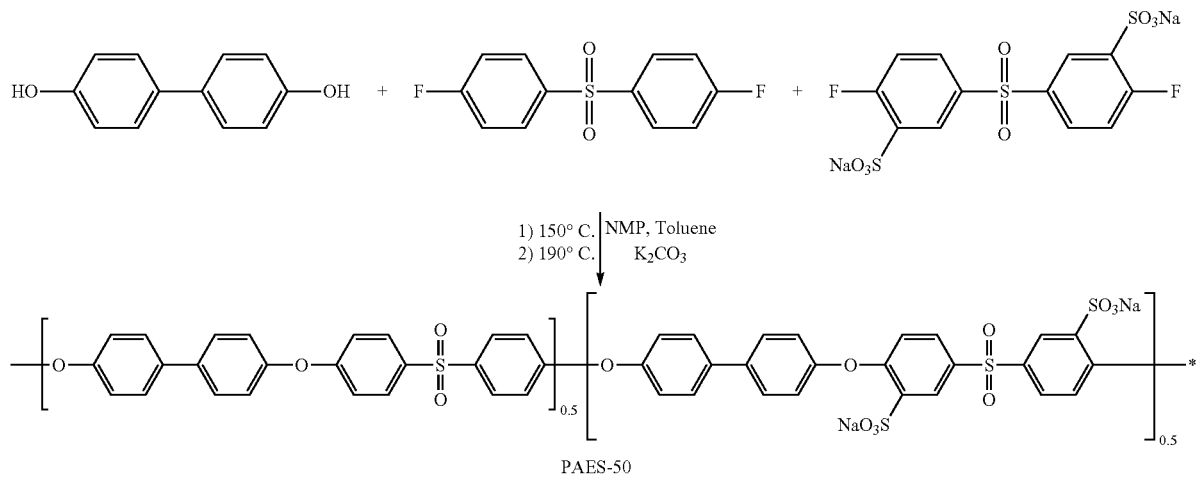

PAES-50 the glass plate, and then was treated with a 1 M aqueous sulfuric acid solution at normal temperature for 24 hours and washed with boiling distilled water.

A composite electrolyte membrane made by mixing Si with PAES-50, a composite membrane made by mixing S-Si with PAES-50, and a composite membrane made by mixing P-Si with PAES-50 were named as "Si50", "S-Si50", and "P-Si50", respectively, and the particles were each used in an amount of 5 wt % based on the weight of PAES-50. When the silica particles (Si) into which a shell structure was not introduced were each added in an amount of 5 wt % or more thereto, the phenomenon in which silica particles were aggregated in the composite electrolyte membrane was exhibited, and accordingly, comparison was made in an amount of 5 wt %.

1) Hydrogen Ion Conductivity

In the present application, the hydrogen ion conductivity of the composite electrolyte membrane may be improved by introducing core-shell silica particles thereinto.

The silica particles form a composite membrane with a polymer matrix to improve the hydrogen ion conductivity based on excellent hygroscopic property while reinforcing dimensional stability and mechanical properties, and the core-shell silica particles having a polymer shell having a sulfonic acid group have more sulfonic acid groups which transfer hydrogen ions, and thus may further improve the conductivity of the electrolyte membrane. The aspect as described above is revealed in the hydrogen ion conductivity data measured under 80° C. and 90% humidity and 80° C. and 50% humidity. In contrast, since the basic polymer captures hydrogen ions produced from a sulfonic acid group of the polymer matrix, it is known that the hydrogen ion conductivity is decreased, but in the present application, P-Si50 exhibited higher hydrogen ion conductivity under both 80° C. and 90% humidity and 80° C. and 50% humidity than that in S-Si50. It can be said that this is caused by the effects in that ion channels through which hydrogen ions can move are developed better due to an acid-base interaction between P-Si and PAES-50, and P-Si strongly captures sulfuric acid by an acid-base interaction between P-Si and sulfuric acid.

For this reason, a difference in hydrogen ion conductivity between P-Si50 and S-Si50 is more clearly shown at a low temperature (30° C.) in which the effects of "Grotthuss mechanism" become more important than the effects of "Vehicle mechanism".

TABLE 1

| Sample | Hydrogen ion conductivity (mS/cm) | | |
|---|---|---|---|
| | 30° C., 90% RH | 80° C., 90% RH | 80° C., 50% RH |
| Example 1 P-Si50 | 53.93 | 155.5 | 14.42 |
| Comparative Example 1 S-Si50 | 45.62 | 155.0 | 12.42 |
| Comparative Example 2 PAES-50 | 50.17 | 117.0 | 4.139 |
| Comparative Example 3 Si50 | 32.82 | 119.5 | 9.392 |

2) Water Absorption Characteristics

The electrolyte membrane was immersed in distilled water at 30° C. for 24 hours, and then the water content and the expansion coefficient were measured.

On the whole, as silica particles were introduced, the water content, the expansion coefficient, and IECv (wet) were decreased.

When compared with S-Si50, P-Si50 exhibited a low expansion coefficient while exhibiting nearly the same water content. Since a high water content increases the number of media through which hydrogen ions can move, the high water content is advantageous in terms of hydrogen ion conductivity, but has a tendency to lose dimensional stability while increasing the expansion coefficient. However, P-Si50 in the present application had a low expansion coefficient while having the same water content as S-Si50, and thus also exhibited the improved dimensional stability.

The IECv (wet) is a value indicating how many mmols of sulfonic acid groups are present per unit volume of the polymer in a state where the electrolyte membrane is wet in water. In the present application, since Si does not have a sulfonic acid group, the IECv (wet) value is decreased when Si is added to PAES-50. Since S-Si has a polymer shell having a sulfonic acid group, the IECv (wet) value of S-Si50 is increased as compared to Si50. Since P-Si has a basic polymer shell which can capture hydrogen ions of a sulfonic acid group, PSi50 has a smaller amount of free hydrogen ions than that of S-Si50. However, since the expansion coefficient is low, the IECv (wet) value of P-Si50 is higher than that of S-Si50. The result is reflected in the fact that while having a smaller amount of sulfonic acid groups, P-Si50 exhibits a hydrogen ion conductivity similar to or higher than that of S-Si50. In contrast, from the result that P-Si50 has a lower IECv (wet) than that of PAES-50 and a higher hydrogen ion conductivity than that of PAES-50, it can be concluded that ion channels in P-Si50 are developed better, and this is due to an effect of an acid-base interaction between P-Si and PAES-50.

TABLE 2

| Sample | | Water content (wt. %) | Expansion coefficient (%) | IECv (wet) (mequiv./cm³) |
|---|---|---|---|---|
| Example 1 | P-Si50 | 37.71 | 38.38 | 1.569 |
| Comparative Example 1 | S-Si50 | 37.32 | 45.09 | 1.522 |
| Comparative Example 2 | PAES-50 | 49.34 | 60.77 | 1.597 |
| Comparative Example 2 | Si50 | 41.09 | 43.06 | 1.466 |

3) Mechanical Properties

The mechanical properties were measured by using a universal testing machine (UTM). The samples were obtained by cutting the electrolyte membrane into a dog-bone shape using ASTM standard D639. The measurement conditions were 25° C. and 40% humidity.

As a result of adding the three silica particles Si, S-Si, and P-Si, the tensile strength and the modulus in the membrane were increased, and the elongation of the membrane was decreased.

TABLE 3

| Sample | | Tensile strength (Mpa) | Young's modulus (Mpa) | Percentage elongation (%) |
|---|---|---|---|---|
| Example 1 | P-Si50 | 53.92 | 3617 | 14.32 |
| Comparative Example 1 | S-Si50 | 54.27 | 6788 | 12.01 |
| Comparative Example 2 | PAES-50 | 39.00 | 2669 | 45.76 |
| Comparative Example 3 | Si50 | 60.92 | 4987 | 24.77 |

The composite electrolyte membrane according to the present application may improve hydrogen ion conductivity, dimensional stability, mechanical strength, and the like by including a core-shell particle having a basic organic polymer shell and a poly(arylene ether sulfone) copolymer, as compared to a polymer electrolyte membrane including only a poly(arylene ether sulfone) copolymer.

Further, the composite electrolyte membrane according to the present application may improve hydrogen ion conductivity, dimensional stability, and the like, as compared to a composite electrolyte membrane including a particle which does not include a shell structure, and a poly(arylene ether sulfone) copolymer.

In addition, the composite electrolyte membrane according to the present application may improve hydrogen ion conductivity, dimensional stability, and the like, as compared to a composite electrolyte membrane including a core-shell particle having an acid polymer shell and a poly(arylene ether sulfone) copolymer.

In particular, the composite electrolyte membrane according to the present application has flexibility which may adjust hydrogen ion conductivity, mechanical properties, dimensional stability, and the like according to the size of the inorganic core, the size of the organic polymer shell, the content ratio of the poly(arylene ether sulfone) copolymer and the core-shell particle, and the like.

What is claimed is:

1. A composite electrolyte membrane comprising:
a poly(arylene ether sulfone) copolymer including a repeating unit represented by the following Chemical Formula 1 and a repeating unit represented by the following Chemical Formula 2; and
a core-shell particle including an inorganic particle core and a basic organic polymer shell:

[Chemical Formula 1]
[Chemical Formula 2]

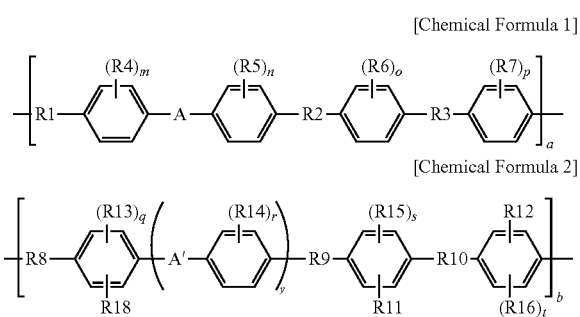

in Chemical Formulae 1 and 2,
R1 to R3 and R8 to R10 are each independently —O—, —S—, —SO$_2$—, —C=O— or —C(CH$_3$)$_2$—,
R4 to R7 and R13 to R16 are each independently hydrogen, or a straight-chained or branch-chained alkyl group having 1 to 10 carbon atoms,
at least one of R11, R12, and R18 is —SO$_3$R17, and the others are hydrogen, or a straight-chained or branch-chained alkyl group having 1 to 10 carbon atoms,
R17 is H, Li, Na, or K, A and A' are each independently a direct bond, a divalent fluorene group, or a straight-chained or branch-chained alkylene group having 1 to 10 carbon atoms,
m, n, o, p, and r are each independently 0 to 4, and q, s, and t are each independently 0 to 3,
y is 0 or 1, and
a and b are a molar ratio of Chemical Formulae 1 and 2, and are each independently 0.1 to 0.99.

2. The composite electrolyte membrane of claim 1, wherein the inorganic particle core comprises one or more selected from a group consisting of a silica particle, TiO$_2$, and ZrO$_2$.

3. The composite electrolyte membrane of claim 1, wherein the inorganic particle core has a diameter of 20 to 900 nm.

4. The composite electrolyte membrane of claim 1, wherein the inorganic particle core comprises a surface-treated inorganic particle, and
the surface treatment uses a silane-based compound, and is performed by a condensation reaction between the inorganic particle and the silane-based compound.

5. The composite electrolyte membrane of claim 4, wherein a surface of the inorganic particle core comprises a vinyl group.

6. The composite electrolyte membrane of claim 1, wherein the basic organic polymer shell comprises one or more selected from a group consisting of polymers prepared by using one or more selected from poly(4-vinylpyridine); and a monomer of the following structural formula:

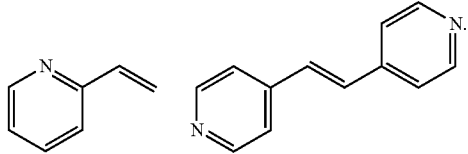

7. The composite electrolyte membrane of claim 1, wherein the basic organic polymer shell has a thickness of 5 to 20 nm.

8. The composite electrolyte membrane of claim 1, wherein the composite electrolyte membrane is for a fuel cell.

9. A method for manufacturing a composite electrolyte membrane, the method comprising:
preparing a poly(arylene ether sulfone) copolymer including a repeating unit represented by the following Chemical Formula 1 and a repeating unit represented by the following Chemical Formula 2;
preparing a composition comprising: the poly(arylene ether sulfone) copolymer; and a core-shell particle comprising an inorganic particle core and a basic organic polymer shell; and
forming a composite electrolyte membrane by using the composition:

[Chemical Formula 1]

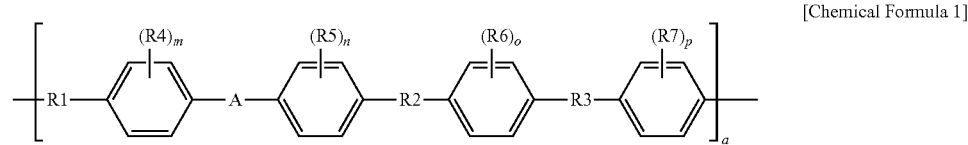

[Chemical Formula 2]

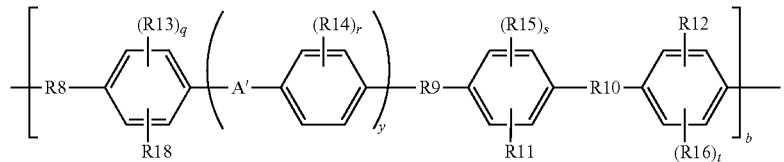

in Chemical Formulae 1 and 2,

R1 to R3 and R8 to R10 are each independently —O—, —S—, —SO$_2$—, —C=O— or —C(CH$_3$)$_2$—, R4 to R7 and R13 to R16 are each independently hydrogen, or a straight-chained or branch-chained alkyl group having 1 to 10 carbon atoms, at least one of R11, R12, and R18 is —SO$_3$R17, and the others are hydrogen, or a straight-chained or branch-chained alkyl group having 1 to 10 carbon atoms, R17 is H, Li, Na, or K, A and A' are each independently a direct bond, a divalent fluorene group, or a straight-chained or branch-chained alkylene group having 1 to 10 carbon atoms, m, n, o, p, and r are each independently 0 to 4, and q, s, and t are each independently 0 to 3, y is 0 or 1, and a and b are a molar ratio of Chemical Formulae 1 and 2, and are each independently 0.1 to 0.99.

10. A fuel cell comprising the composite electrolyte membrane of claim 1.

\* \* \* \* \*